US012806771B2

(12) United States Patent
Majd et al.

(10) Patent No.: US 12,806,771 B2
(45) Date of Patent: Nov. 24, 2026

(54) LEARNING PERCEIVED PREFERENCES IN HUMAN-ROBOT INTERACTIONS (HRI)

(71) Applicant: Honda Motor Co., Ltd., Tokyo (JP)

(72) Inventors: Keyvan Majd, Ann Arbor, MI (US); Rana Soltani Zarrin, Los Gatos, CA (US)

(73) Assignee: Honda Motor Co., Ltd., Tokyo (JP)

( * ) Notice: Subject to any disclaimer, the term of this patent is extended or adjusted under 35 U.S.C. 154(b) by 26 days.

(21) Appl. No.: 18/948,157

(22) Filed: Nov. 14, 2024

(65) Prior Publication Data

US 2025/0345931 A1 Nov. 13, 2025

Related U.S. Application Data

(60) Provisional application No. 63/646,930, filed on May 13, 2024.

(51) Int. Cl.
*B25J 9/16* (2006.01)
*G06F 3/01* (2006.01)

(52) U.S. Cl.
CPC .............. *B25J 9/163* (2013.01); *G06F 3/016* (2013.01)

(58) Field of Classification Search
CPC .................................. B25J 9/163; G06F 3/016
See application file for complete search history.

(56) References Cited

U.S. PATENT DOCUMENTS

| | | | | |
|---|---|---|---|---|
| 2013/0345863 | A1* | 12/2013 | Linder | B25J 9/163 901/50 |
| 2019/0351547 | A1* | 11/2019 | Onuma | B25J 5/007 |
| 2021/0003993 | A1* | 1/2021 | Hashimoto | G06N 20/00 |
| 2021/0138655 | A1* | 5/2021 | Mousavian | B25J 9/1666 |
| 2021/0173377 | A1* | 6/2021 | Laftchiev | G05B 13/0265 |
| 2022/0032454 | A1* | 2/2022 | Yang | B25J 9/1612 |
| 2023/0294276 | A1* | 9/2023 | Chao | B25J 9/1605 700/250 |

OTHER PUBLICATIONS

Losey DP, Bajcsy A, O'Malley MK, Dragan AD. Physical interaction as communication: Learning robot objectives online from human corrections. The International Journal of Robotics Research. 2021;41(1):20-44. doi:10.1177/02783649211050958 (Year: 2021).*

Losey DP, Bajcsy A, O'Malley MK, Dragan AD. Physical interaction as communication: Learning robot objectives online from human corrections. The International Journal of Robotics Research. 2021;41(1):20-44. doi:10.1177/02783649211050958 (Year: 2021) (Year: 2021).*

(Continued)

*Primary Examiner* — Michael C Zarroli
*Assistant Examiner* — John Martin O'Malley
(74) *Attorney, Agent, or Firm* — Rankin, Hill & Clark LLP

(57) ABSTRACT

According to one aspect, learning perceived preferences in human-robot interactions (HRI) may include sensing a noisy action from a human associated with a human-robot interaction (HRI) with a robot, generating a feature associated with the human based on the noisy action and an observation model, generating a belief based on the feature and a belief model, generating a robot action based on a reference trajectory, the belief, and one or more constraints, and implementing the robot action for the HRI via a robot appendage of the robot and an actuator.

20 Claims, 5 Drawing Sheets

(56) References Cited

OTHER PUBLICATIONS

A. Bajcsy, D. P. Losey, M. K. O'malley, and A. D. Dragan. Learning robot objectives from physical human interaction. In Conference on robot learning, pp. 217-226. PMLR, 2017.
J. Carifio and R. J. Perla. Ten common misunderstandings, misconceptions, persistent myths and urban legends about likert scales and likert response formats and their antidotes. Journal of social sciences, 3(3):106-116, 2007.
Q. H. Ho, T. Becker, B. Kraske, Z. Laouar, M. Feather, F. Rossi, M. Lahijanian, and Z. N. Sunberg. Recursively-constrained partially observable markov decision processes. arXiv preprint arXiv:2310.09688, 2023.
J. D. Isom, S. P. Meyn, and R. D. Braatz. Piecewise linear dynamic programming for constrained pomdps. In AAAI, vol. 1, pp. 291-296, 2008.
S. Javdani, S. S. Srinivasa, and J. A. Bagnell. Shared autonomy via hindsight optimization. Robotics science and systems: online proceedings, 2015, 2015.
P. A. Lasota, T. Fong, J. A. Shah, et al. A survey of methods for safe human-robot interaction. Foundations and Trends® in Robotics, 5(4):261-349, 2017.
J. Li, D. Fridovich-Keil, S. Sojoudi, and C. J. Tomlin. Augmented lagrangian method for instantaneously constrained reinforcement learning problems. In 2021 60th IEEE Conference on Decision and Control (CDC), pp. 2982-2989. IEEE, 2021.
D. P. Losey, A. Bajcsy, M. K. O'Malley, and A. D. Dragan. Physical interaction as communication: Learning robot objectives online from human corrections. The International Journal of Robotics Research, 41(1):20-44, 2022.
L. Peternel, N. Tsagarakis, D. Caldwell, and A. Ajoudani. Adaptation of robot physical behaviour to human fatigue in human-robot co-manipulation. In 2016 IEEE-RAS 16th International Conference on Humanoid Robots (Humanoids), pp. 489-494. IEEE, 2016.
M. Rubagotti, I. Tusseyeva, S. Baltabayeva, D. Summers, and A. Sandygulova. Perceived safety in physical human-robot interaction—a survey. Robotics and Autonomous Systems, 151:104047, 2022.
K. Wray, S. Zilberstein, and A.-I. Mouaddib. Multi-objective mdps with conditional lexicographic reward preferences. In Proceedings of the AAAI Conference on Artificial Intelligence, vol. 29, 2015.
I.O. for Standardization. Robots and Robotic Devices: Safety Requirements for Personal Care Robots. 2014. (ISO 13482:2014).
Villani, V., Pini, F., Leali, F., & Secchi, C. (2018). Survey on human-robot collaboration in industrial settings: Safety, intuitive interfaces and applications. Mechatronics,55, 248-266.

* cited by examiner

LEARNING PERCEIVED PREFERENCES IN HUMAN-ROBOT INTERACTIONS (HRI)

CROSS-REFERENCE TO RELATED APPLICATIONS

This application claims the benefit of U.S. Provisional Patent Application, Ser. No. 63/646,930 entitled "LEARNING HUMAN'S PERCEIVED SAFETY IN HUMAN-ROBOT INTERACTIONS", filed on May 13, 2024; the entirety of the above-noted application(s) is incorporated by reference herein.

BACKGROUND

Human robot interaction (HRI) is the study of interactions between humans and robots. HRI is a multidisciplinary field with contributions from human-computer interaction, artificial intelligence, robotics, natural language processing, design, psychology, and philosophy. A subfield known as physical human-robot interaction (pHRI) has tended to focus on device design to enable people to interact with robotic systems in a desired manner.

BRIEF DESCRIPTION

According to one aspect, a system for learning perceived preferences in human-robot interactions (HRI) may include a sensor, a memory, a processor, a controller, a robot appendage, and an actuator. The sensor may sense a noisy action from a human associated with a human-robot interaction (HRI) with a robot. The memory may store one or more instructions. The processor may execute one or more of the instructions stored on the memory to perform one or more acts, actions, and/or steps. For example, the processor may generate a feature associated with the human based on the noisy action and an observation model, generate a belief based on the feature and a belief model, and generate a robot action based on a reference trajectory, the belief, and one or more constraints. The controller may implement the robot action for the HRI via a robot appendage of the robot and an actuator.

The observation model may be based on Boltzmann rationality and maximum entropy. The HRI may be modeled as a Constrained Partially Observable Markov Decision Process (CPOMDP). The HRI may be a bi-lateral interaction including a second human associated with a second HRI with a second robot. The second robot may provide haptic feedback to the second human based on a human response to the robot action. The generating the belief may be based on trajectory deformation of a current trajectory of the robot by replacing a waypoint of the current trajectory with a waypoint associated with the feature associated with the human based on the noisy action. The generating the belief may be based on a maximum a posteriori (MAP) estimation of the belief. The generating the feature may be based on a radial basis function (RBF). One or more of the constraints may include a joint limit constraint, a force constraint, a velocity constraint, an acceleration constraint, a task space constraint, or a deviation constraint. The generating the robot action may be based on a hierarchical optimization of a first constraint of the one or more constraints and a second constraint of the one or more constraints.

According to one aspect, a computer-implemented method for learning perceived preferences in human-robot interactions (HRI) may include sensing a noisy action from a human associated with a human-robot interaction (HRI) with a robot, generating a feature associated with the human based on the noisy action and an observation model, generating a belief based on the feature and a belief model, generating a robot action based on a reference trajectory, the belief, and one or more constraints, and implementing the robot action for the HRI via a robot appendage of the robot and an actuator.

The observation model may be based on Boltzmann rationality and maximum entropy. The HRI may be modeled as a Constrained Partially Observable Markov Decision Process (CPOMDP). The HRI may be a bi-lateral interaction including a second human associated with a second HRI with a second robot. The second robot may provide haptic feedback to the second human based on a human response to the robot action.

According to one aspect, a robot for learning perceived preferences in human-robot interactions (HRI) may include a sensor, a memory, a processor, a controller, a robot appendage, and an actuator. The sensor may sense a noisy action from a human associated with a human-robot interaction (HRI) with the robot. The memory may store one or more instructions. The processor may execute one or more of the instructions stored on the memory to perform one or more acts, actions, and/or steps. For example, the processor may generate a feature associated with the human based on the noisy action and an observation model, generate a belief based on the feature and a belief model, and generate a robot action based on a reference trajectory, the belief, and one or more constraints. The controller may implement the robot action for the HRI via a robot appendage of the robot and an actuator.

The observation model may be based on Boltzmann rationality and maximum entropy. The HRI may be modeled as a Constrained Partially Observable Markov Decision Process (CPOMDP). The HRI may be a bi-lateral interaction including a second human associated with a second HRI with a second robot. The second robot may provide haptic feedback to the second human based on a human response to the robot action.

DETAILED DESCRIPTION

Figure 1:
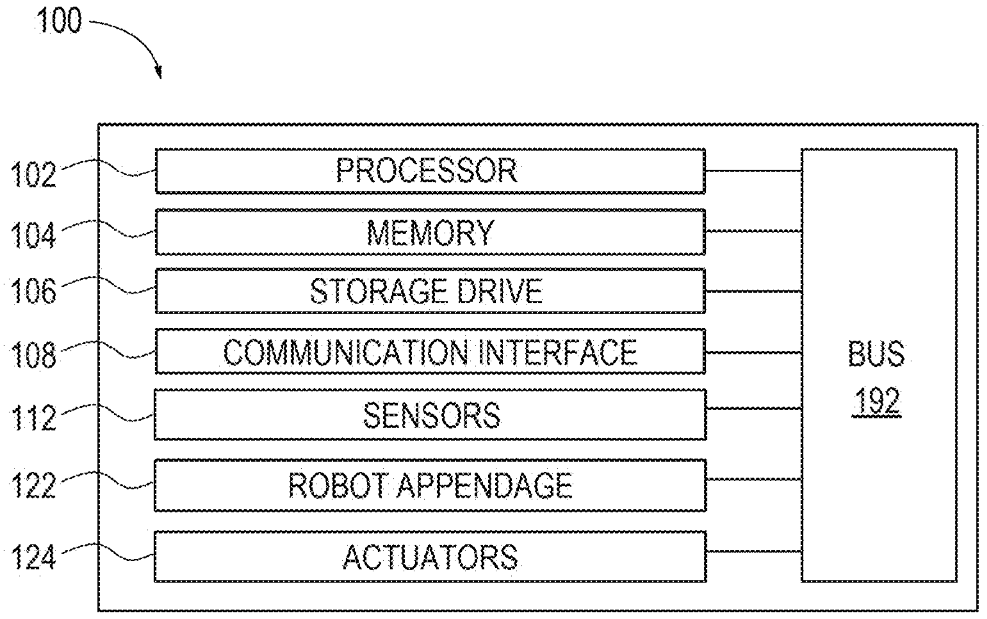
FIG. 1 is an exemplary component diagram of a system for learning perceived preferences in human-robot interactions (HRI), according to one aspect.

The following includes definitions of selected terms employed herein. The definitions include various examples and/or forms of components that fall within the scope of a term and that may be used for implementation. The examples are not intended to be limiting. Further, one having ordinary skill in the art will appreciate that the components discussed herein, may be combined, omitted, or organized with other components or organized into different architectures.

A "processor", as used herein, processes signals and performs general computing and arithmetic functions. Signals processed by the processor may include digital signals, data signals, computer instructions, processor instructions, messages, a bit, a bit stream, or other means that may be received, transmitted, and/or detected. Generally, the processor may be a variety of various processors including multiple single and multicore processors and co-processors and other multiple single and multicore processor and co-processor architectures. The processor may include various modules to execute various functions.

A "memory", as used herein, may include volatile memory and/or non-volatile memory. Non-volatile memory may include, for example, ROM (read only memory), PROM (programmable read only memory), EPROM (erasable PROM), and EEPROM (electrically erasable PROM). Volatile memory may include, for example, RAM (random access memory), synchronous RAM (SRAM), dynamic RAM (DRAM), synchronous DRAM (SDRAM), double data rate SDRAM (DDRSDRAM), and direct RAM bus RAM (DRRAM). The memory may store an operating system that controls or allocates resources of a computing device.

A "disk" or "drive", as used herein, may be a magnetic disk drive, a solid-state disk drive, a floppy disk drive, a tape drive, a Zip drive, a flash memory card, and/or a memory stick. Furthermore, the disk may be a CD-ROM (compact disk ROM), a CD recordable drive (CD-R drive), a CD rewritable drive (CD-RW drive), and/or a digital video ROM drive (DVD-ROM). The disk may store an operating system that controls or allocates resources of a computing device.

A "bus", as used herein, refers to an interconnected architecture that is operably connected to other computer components inside a computer or between computers. The bus may transfer data between the computer components. The bus may be a memory bus, a memory controller, a peripheral bus, an external bus, a crossbar switch, and/or a local bus, among others. The bus may also be a vehicle bus that interconnects components inside a vehicle using protocols such as Media Oriented Systems Transport (MOST), Controller Area network (CAN), Local Interconnect Network (LIN), among others.

A "database", as used herein, may refer to a table, a set of tables, and a set of data stores (e.g., disks) and/or methods for accessing and/or manipulating those data stores.

An "operable connection", or a connection by which entities are "operably connected", is one in which signals, physical communications, and/or logical communications may be sent and/or received. An operable connection may include a wireless interface, a physical interface, a data interface, and/or an electrical interface.

A "computer communication", as used herein, refers to a communication between two or more computing devices (e.g., computer, personal digital assistant, cellular telephone, network device) and may be, for example, a network transfer, a file transfer, an applet transfer, an email, a hypertext transfer protocol (HTTP) transfer, and so on. A computer communication may occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others.

A "mobile device", as used herein, may be a computing device typically having a display screen with a user input (e.g., touch, keyboard) and a processor for computing. Mobile devices include handheld devices, portable electronic devices, smart phones, laptops, tablets, and e-readers.

A "robot", as used herein, may be a machine, such as one programmable by a computer, and capable of carrying out a complex series of actions automatically. A robot may be guided by an external control device or the control may be embedded within a controller. It will be appreciated that a robot may be designed to perform a task with no regard to appearance. Therefore, a 'robot' may include a machine which does not necessarily resemble a human, including a vehicle, a device, a flying robot, a manipulator, a robotic arm, etc.

A "robot system", as used herein, may be any automatic or manual systems that may be used to enhance robot performance. Exemplary robot systems include a motor system, an autonomous driving system, an electronic stability control system, an anti-lock brake system, a brake assist system, an automatic brake prefill system, a low speed follow system, a cruise control system, a collision warning system, a collision mitigation braking system, an auto cruise control system, a lane departure warning system, a blind spot indicator system, a lane keep assist system, a navigation system, a transmission system, brake pedal systems, an electronic power steering system, visual devices (e.g., camera systems, proximity sensor systems), a climate control system, an electronic pretensioning system, a monitoring system, a passenger detection system, a suspension system, an audio system, a sensory system, among others.

FIG. 1 is an exemplary component diagram of a system 100 for learning perceived preferences in human-robot interactions (HRI), according to one aspect. The system 100 for learning perceived preferences in human-robot interactions (HRI) may include a processor 102, a memory 104, a storage drive 106, a communication interface 108, one or more sensors 112, a controller, a robot appendage 122, an actuators 124, and a bus 192, which may communicatively couple the respective components and enable computer communication therebetween. As discussed herein, actions, calculations, determinations, problem formulations, etc. performed by the robot may be understood to be implemented by the processor 102, the memory 104, the storage drive 106, etc.

The processor 102 may execute one or more of the instructions stored on the memory 104 to perform one or more acts, actions, and/or steps. The memory 104 may store one or more instructions. The storage drive 106 may store one or more models, such as an observation model or a belief model, for example. The communication interface 108 may receive one or more of the models from an external device, such as a remote server. A sensor 112 may sense a noisy action from a human associated with a human-robot interaction (HRI) with a robot. The HRI may be modeled as a Constrained Partially Observable Markov Decision Process (CPOMDP).

Constrained Partially Observable Markov Decision Process (CPOMDP)

A Constrained Partially Observable Markov Decision Process (CPOMDP) may be formally defined via the processor 102 by a tuple $\langle \mathcal{S}, \mathcal{A}, \mathcal{O}, \mathcal{G}, p_s, p_o, r, \gamma, b^0 \rangle$, where $\mathcal{S}$ is the set of states $s=(s_R, s_H)$ that includes a robot state $s_R$ and a hidden human desired state $s_H$. The compact sets of robot actions $a_R$ and observations o (e.g., human actions $a_H$) may be denoted by $\mathcal{A}$ and $\mathcal{O}$, respectively. Also, $\mathcal{G}$ may denote the set of K constraint functions, (e.g., $$\mathcal{G} = \{g^k(s^t, a_R^t)\}_{k=1}^K).$$

Here, $$p_s(s^{t+1} \mid s^t, a_R^t)$$

denotes a transition probability model, $p_z(o^{t+1}|s^{t+1})$ denotes the probabilistic observation model, $$r(s^t, a_R^t)$$

is the immediate reward function, $\gamma$ is the discounting factor, and $b^0=b(s^0)$ is the initial belief over the states. Given a system state s which is partially known, a belief is a function of s. However, it may be assumed that the only unknown state is $s_H$, so belief is only a function of $s_H$, e.g., $b(s_H)$. Here, $$b^t(s_H) = p(s_H \mid s_R^{0:t}, a_R^{0:t}, a_H^{0:t})$$

is defined as the probability of a human's interaction preference $s_H$, given a history of robot states $$s_R^{0:t},$$

robot actions $$a_R^{0:t},$$

and human actions $$a_H^{0:t}$$

from time step 0 to t. The human's preferred state values $s_H$ is not known to the robot, but given the human actions $a_H$ (e.g., language feedback or kinesthetic demonstration), the robot may update its belief over $s_H$. Humans may have different preferences depending on the current stage of a task. For example, during collaborative tasks where the robot and human work closely together, the human may prioritize low-speed movements or gentle actions to reduce the risk of injuries. Conversely, when the robot is not in contact with the human, the human may prefer it to maintain a desired distance. This variability in the human's desired behavior may be captured by defining a task phase parameter, denoted as $\rho\in[0,1]$ by specifying the context or stage of the task. Depending on $\rho$, the human's preferences may differ (e.g., $a_H(\rho)$).

The robot may select actions according to a policy $\pi: \Delta(\mathcal{S})\rightarrow\mathcal{A}$, where $\Delta(\mathcal{S})$ is the probability simplex (the set of all probability distributions) over $\mathcal{S}$. CPOMDP enables the benefit or advantage of multi-objective decision making where one of the objectives is optimized while the remaining objectives are bounded:

$$\max_\pi V_R^\pi(b) = \mathbb{E}_\pi\left[\sum_t r(s_H^t, s_R^t, a_R^t) \,\middle|\, b^0 = b\right], \quad (1)$$
$$\text{s.t. } V_{g^k}^\pi(b) = \mathbb{E}_\pi\left[\sum_t g^k(s_H^t, s_R^t, a_R^t) \,\middle|\, b^0 = b\right] \geq 0, \forall \{k\}_{k=1}^K$$

where $\mathbb{E}[\cdot]$ is the expectation operator. For simplicity, it may be assumed that $\gamma=1$. Without loss of generality, it may be assumed that the reward function is only a function of robot's states and actions (e.g., $$r = r(s_R^t, a_R^t)).$$

The processor 102 may define the constraint value as $$Q_{g^k}^\pi(b^t, s_R^t, a_R^t) = g^k(b^t, s_R^t, a_R^t) + \mathbb{E}_{b^{t+1}}\left[V_{g^k}^\pi(b^{t+1})\right].$$

Solving the CPOMDP from Equation (1) suggests that the robot may anticipate future human actions $a_H$, and adjust $a_R$ to ensure that the human's preferred constraints are satisfied.

Parameterizing Perceived Preference with Bounding Constraints

Perceived preferences related to interaction force $s_{H_F}$, velocity $s_{H_V}$, and proximity $s_{H_P}$ are discussed herein. The processor 102 may parameterize $s_H$ as $s_H=\omega^T\phi(s_R)$, where $\phi\in\mathbb{R}^N$ represents the normalized vector of N features and $\omega\in\mathbb{R}^N$ is a parameter that determines the weight for each feature. The processor 102 may define the perceived preference or constraint as $g_H=s_H-s_R=\omega^T\phi-s_R\geq0$, where $\omega^T\phi$ specifies an upper bound over the robot's $s_R$. Given this definition, the robot may generate actions $a_R$ to satisfy the perceived preference or constraints. The robot may not be aware of the human's desired parameter $\omega$, but the robot may update its belief based on the human's preferences inferred from the observed actions $a_H$. Therefore, reduce the belief from $s_H$ as a function of $\omega$, e.g., $b=b(\omega(\rho))$. To ensure the feasibility of satisfying $g_H$ for the robot, the constraints related to the dynamics of robot, and its joint and task space limitations may be considered.

Observation Model

Based on the Boltzmann rationality and maximum entropy assumptions, the following observation function may be utilized:

$$p_z(a_H^t \mid s_R^t, s_H, a_R^t) = \frac{e^{Qg_k(s_R^t, a_R^t + a_H^t, s_H)}}{\int e^{Qg_k(s_R^t, a_R^t + \tilde{a}_H^t, s_H)} d\tilde{a}_H} \quad (2)$$

Online Hierarchical Optimization for CPOMDP Approximation

Assuming that $s_H$ becomes fully observable to the robot at a next time step, e.g., $$b^{t+1}(s_H = s_h^{desired}) = 1,$$

finding the optimal robot policy may be separated from estimating human's preferences. This separation may be performed based on the POMDP reduction to QMDP. The processor 102 may find the robot's optimal policy given the current belief $b(s_H)$ over the human's desired state values by evaluating $$a_R^* = \arg\max_{a_R} Q_{gk}^{\pi}(b^t, s_R^t, a_R^t)$$

at every state such that $$Q_{gk}^{\pi}(b^t, s_R^t, a_R^t) = \mathbb{E}_{b(s_H^t)}\left[Q_{gk}^{\pi}(s_H^t, s_R^t, a_R^t)\right].$$

Then, the processor 102 may update the belief $b(s_H)$ over the human's preferences at next time step as:

$$b^{t+1}(s_H) = \frac{p_z(a_H^t \mid s_R^t, s_H) b^t(s_H)}{\int p_z(a_H^t \mid S_R^t, \tilde{s}_H) b^t(\tilde{s}_H)\, d\tilde{s}_H} \tag{3}$$

Hierarchical Optimization (HO)

The challenge of finding the optimal policy given the current estimate of $\hat{\omega}$ may be circumvented by moving toward planning in trajectory space. The processor 102 may plan an optimal trajectory from the start point to goal (denoted as $\zeta$), and track the planned trajectory in real-time with a hierarchical controller.

For example, the robot may initially plan a set of trajectories for the desired robot end-effector positions $$\zeta_{p_r}^0,$$

desired interaction force profile $$\zeta_{f_r}^0,$$

and the desired velocity profile $$\zeta_{v_r}^0.$$

Next, the processor 102 may utilize a hierarchical planner to track the desired trajectory in real-time.

Belief Update, Part I

To relate the human's action $a_H$ to $\omega$, the processor 102 may propagate the human's interaction over the current desired robot's trajectory using trajectory deformation. The processor 102 may denote the estimation from the human's intended trajectory at time t as $$\zeta_h^t.$$

The processor 102 may deform the trajectory by modifying all waypoints within a neighborhood q of the observed waypoint associated with the human at time t, replacing the waypoints with the human's specified value if they exceed the observed waypoint. Formally, $$\zeta_h^t(i) > o(s_h^t) \rightarrow \zeta_h^t(i) = o(s_h^t),$$

$\forall i \in [t-q, t+q]$, where $$o(s_h^t)$$

represents the observed waypoint at time t and $q \in \mathbb{R}^+$ defines the extent of the neighborhood centered around time t.

Belief Update, Part II

Assuming that the approximated human's intended trajectory maximizes the cumulative constraint function values, the processor 102 may approximate the observation model from Equation (2) about the robot's trajectory $a_R$ as follows:

$$p_z(\zeta_h^t \mid \zeta_r^t, \omega) \approx e^{G_k^h(a_H, \omega) - G_k^h(a_R, \omega)} \tag{4}$$

Here, $G_k(\zeta, \omega) = \Sigma_{s \in \zeta}(\omega^T \phi(s) - s)$ encodes the summation of constraint values along the trajectory $\zeta$.

Belief Update, Part III

Given the prior belief over $\omega$ as $b^0(\omega) \approx e^{-1/2\alpha\|\omega - \hat{\omega}^0\|}$, the processor 102 may derive an update rule by a maximum a posteriori (MAP) estimate of Equation (3) as follows:

$$\hat{\omega}^{t+1} = \hat{\omega}^{t+1} + \alpha(\Phi(\zeta_h^t) - \Phi(\zeta_h^t)) \tag{5}$$

where $\Phi(\zeta_r^t) = \sum_{s^t \in \zeta_r^t} \phi(s^t)$. Here, $\hat{\omega}^{t+1}$ optimizes:

$$\hat{\omega}^{t+1} = \arg\max_{\omega}\left[\sum_{i=o}^{t} \left(\ln p_z(\zeta_h^i \mid \zeta_r^i, \omega)\right) + \ln b^t(\omega)\right] \tag{6}$$

Humans may not possess a direct sensation of force and velocity metrics. For example, humans cannot precisely discern what a force value of 2 Newtons of force feels like, leading to inherent noise in human actions. Therefore, it may be assumed that human adjusts the level of application of the target variable in response to current preference values, e.g., discretizing the force adjustment within a range from 1 to N, where N represents the highest force level. As a result, the processor 102 may define the feature vector for perceived force as $\phi_F(s_{F_r}) = [\psi(s_{F_r} - F_1), \ldots, \psi(s_{F_r} - F_N)]$, where may denote the robot's interaction force and $$\{F_i\}_1^N$$

represents the set of force levels. The processor 102 may utilize Radial Basis Functions (RBF), denoted by $\psi(s)=e^{-\beta s^2}$, to construct one or more of the features. However, $\beta$ fine-tuning may be desired.

Further, The HRI may be a bi-lateral interaction including a second human associated with a second HRI with a second robot or merely a unilateral interaction between the human and the robot. The second robot may provide haptic feedback to the second human based on a human response to the robot action.

In this way, the processor 102 may generate a feature associated with the human based on the noisy action and an observation model. The observation model may be based on Boltzmann rationality and maximum entropy. The generating the feature may be based on a radial basis function (RBF). The processor 102 may generate a belief based on the feature and a belief model. The generating the belief may be based on trajectory deformation of a current trajectory of the robot by replacing a waypoint of the current trajectory with a waypoint associated with the feature associated with the human based on the noisy action. The generating the belief may be based on a maximum a posteriori (MAP) estimation of the belief. The processor 102 may generate a robot action based on a reference trajectory, the belief, and one or more constraints. A constraint of the one or more of the constraints may include a joint limit constraint, a force constraint, a velocity constraint, an acceleration constraint, a task space constraint, or a deviation constraint. The generating the robot action may be based on a hierarchical optimization of a first constraint of the one or more constraints and a second constraint of the one or more constraints. The controller may implement the robot action for the HRI via a robot appendage 122 of the robot and actuators 124.

Figure 2:
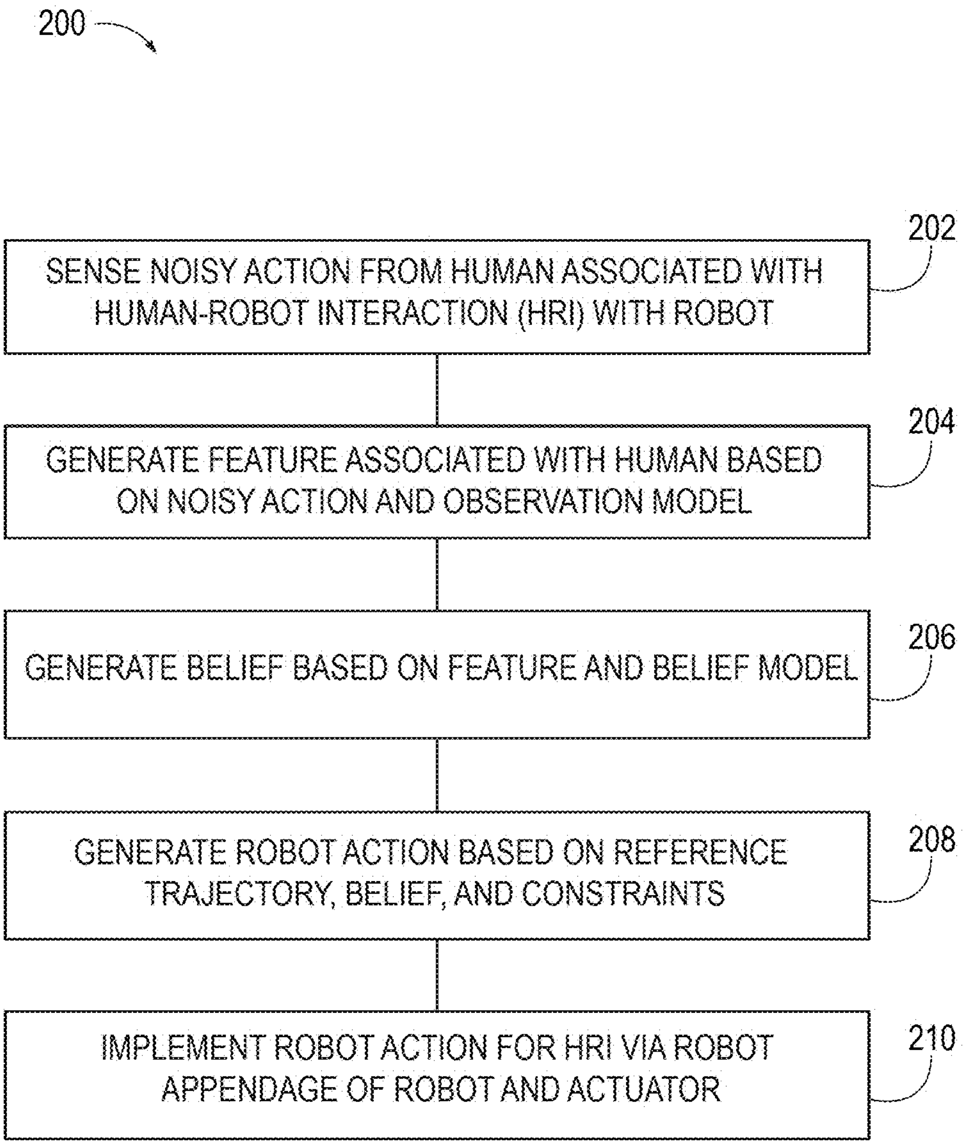
FIG. 2 is an exemplary flow diagram of a computer-implemented method for learning perceived preferences in human-robot interactions (HRI), according to one aspect.

FIG. 2 is an exemplary flow diagram of a computer-implemented method 200 for learning perceived preferences in human-robot interactions (HRI), according to one aspect. The computer-implemented method 200 for learning perceived preferences in human-robot interactions (HRI) may include sensing 202 a noisy action from a human associated with a human-robot interaction (HRI) with a robot, generating 204 a feature associated with the human based on the noisy action and an observation model, generating 206 a belief based on the feature and a belief model, generating 208 a robot action based on a reference trajectory, the belief, and one or more constraints, and implementing 210 the robot action for the HRI via a robot appendage of the robot and an actuator.

Figure 3:
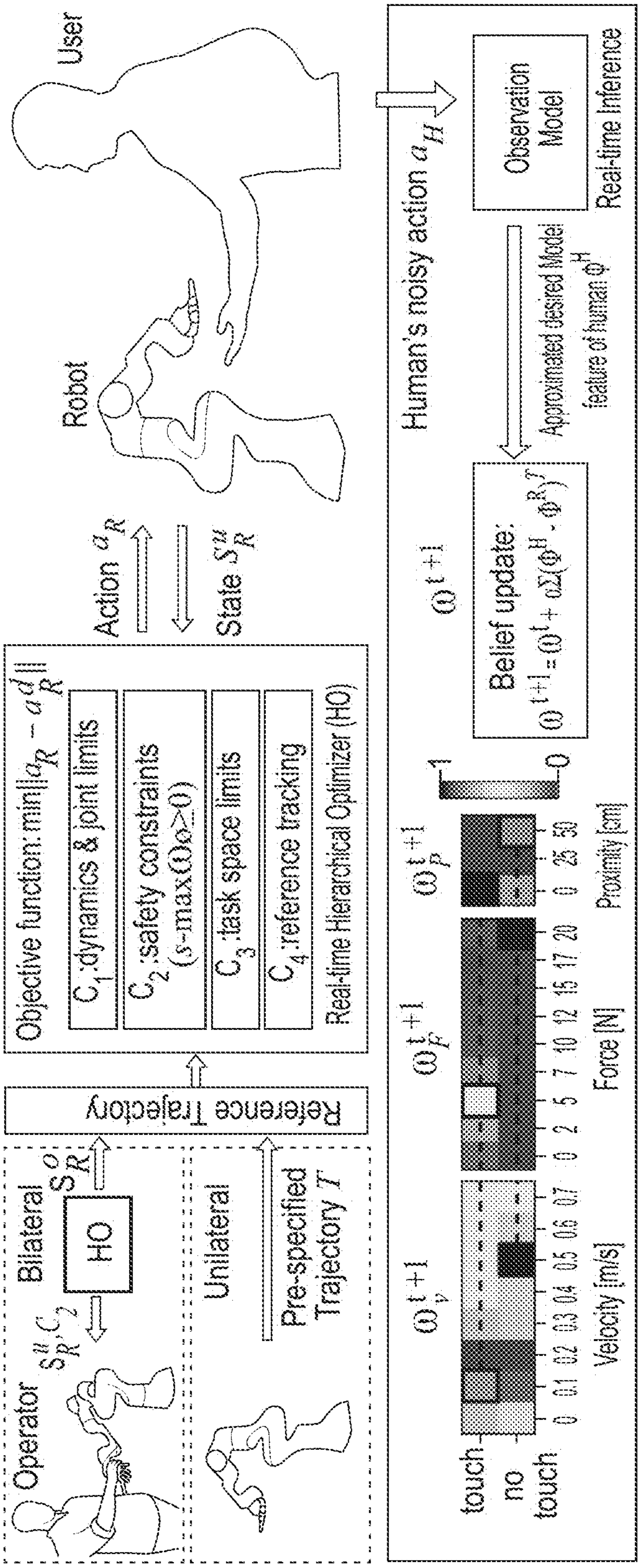
FIG. 3 is an exemplary component diagram of a framework associated with the system for learning perceived preferences in human-robot interactions (HRI) of FIG. 1, according to one aspect.

FIG. 3 is an exemplary component diagram of a framework associated with the system for learning perceived preferences in human-robot interactions (HRI) of FIG. 1, according to one aspect. As seen in FIG. 3, a noisy action from a human associated with a human-robot interaction (HRI) with a robot may be sensed. Based on the sensed noisy action, a feature associated with the human based on the noisy action and an observation model may be generated. Based on the feature, a belief based on the feature and a belief model, generating a robot action based on a reference trajectory, the belief, and one or more constraints may be generated. The robot action for the HRI may be implemented via a robot appendage of the robot and an actuator.

Figure 4:
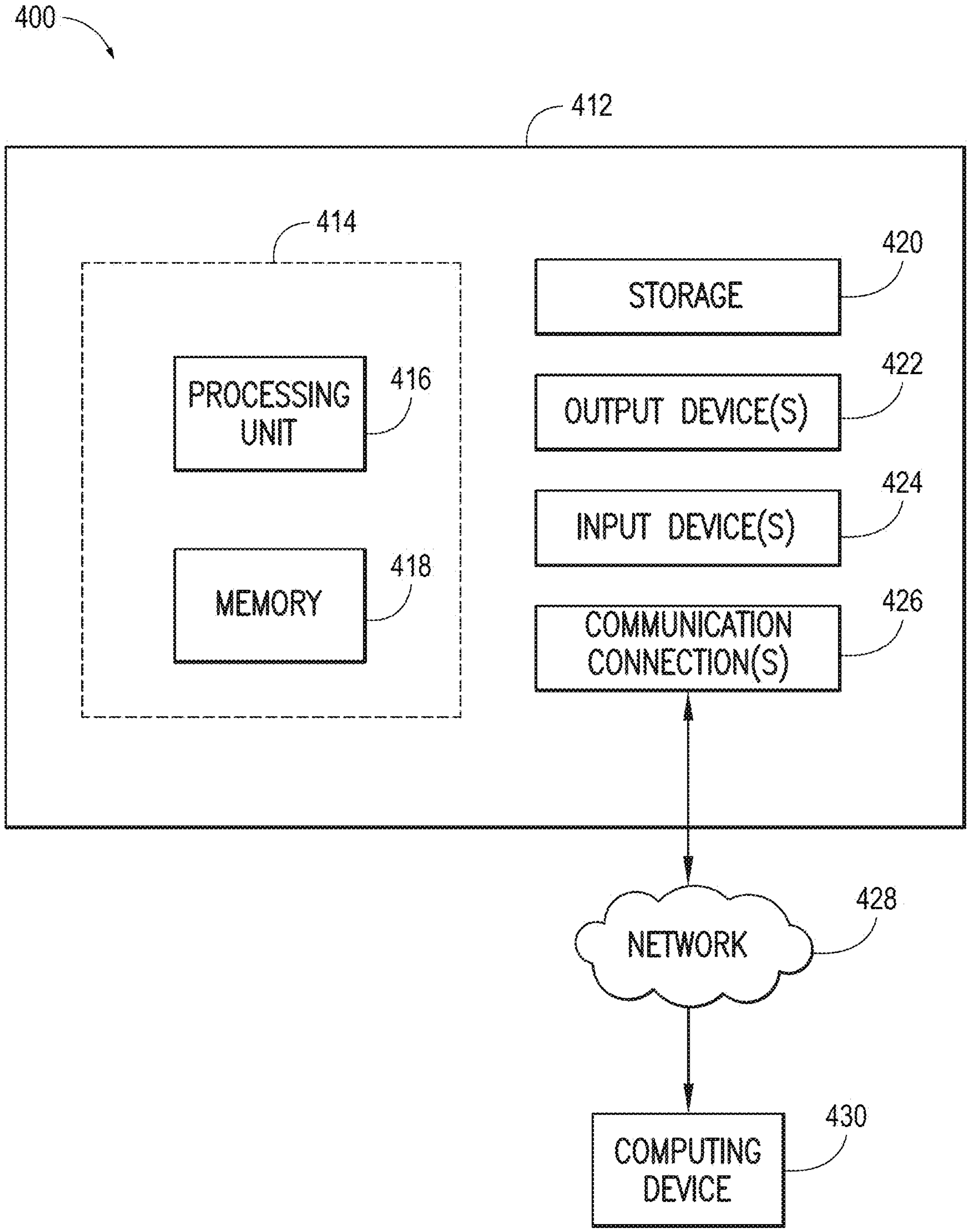
FIG. 4 is an illustration of an example computing environment where one or more of the provisions set forth herein are implemented, according to one aspect.

FIG. 4 and the following discussion provide a description of a suitable computing environment to implement aspects of one or more of the provisions set forth herein. The operating environment of FIG. 4 is merely one example of a suitable operating environment and is not intended to suggest any limitation as to the scope of use or functionality of the operating environment. Example computing devices include, but are not limited to, personal computers, server computers, hand-held or laptop devices, mobile devices, such as mobile phones, Personal Digital Assistants (PDAs), media players, and the like, multiprocessor systems, consumer electronics, mini computers, mainframe computers, distributed computing environments that include any of the above systems or devices, etc.

Generally, aspects are described in the general context of "computer readable instructions" being executed by one or more computing devices. Computer readable instructions may be distributed via computer readable media as will be discussed below. Computer readable instructions may be implemented as program modules, such as functions, objects, Application Programming Interfaces (APIs), data structures, and the like, that perform one or more tasks or implement one or more abstract data types. Typically, the functionality of the computer readable instructions are combined or distributed as desired in various environments.

FIG. 4 illustrates a system 400 including a computing device 412 configured to implement one aspect provided herein. In one configuration, the computing device 412 includes at least one processing unit 416 and memory 418. Depending on the exact configuration and type of computing device, memory 418 may be volatile, such as RAM, non-volatile, such as ROM, flash memory, etc., or a combination of the two. This configuration is illustrated in FIG. 4 by dashed line 414.

In other aspects, the computing device 412 includes additional features or functionality. For example, the computing device 412 may include additional storage such as removable storage or non-removable storage, including, but not limited to, magnetic storage, optical storage, etc. Such additional storage is illustrated in FIG. 4 by storage 420. In one aspect, computer readable instructions to implement one aspect provided herein are in storage 420. Storage 420 may store other computer readable instructions to implement an operating system, an application program, etc. Computer readable instructions may be loaded in memory 418 for execution by the at least one processing unit 416, for example.

The term "computer readable media" as used herein includes computer storage media. Computer storage media includes volatile and nonvolatile, removable, and non-removable media implemented in any method or technology for storage of information such as computer readable instructions or other data. Memory 418 and storage 420 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which may be used to store the desired information and which may be accessed by the computing device 412. Any such computer storage media is part of the computing device 412.

The term "computer readable media" includes communication media. Communication media typically embodies computer readable instructions or other data in a "modulated data signal" such as a carrier wave or other transport mechanism and includes any information delivery media. The term "modulated data signal" includes a signal that has one or more of its characteristics set or changed in such a manner as to encode information in the signal.

The computing device 412 includes input device(s) 424 such as keyboard, mouse, pen, voice input device, touch input device, infrared cameras, video input devices, or any other input device. Output device(s) 422 such as one or more displays, speakers, printers, or any other output device may be included with the computing device 412. Input device(s) 424 and output device(s) 422 may be connected to the computing device 412 via a wired connection, wireless connection, or any combination thereof. In one aspect, an input device or an output device from another computing device may be used as input device(s) 424 or output device(s) 422 for the computing device 412. The computing device 412 may include communication connection(s) 426 to facilitate communications with one or more other devices 430, such as through network 428, for example.

Figure 5:
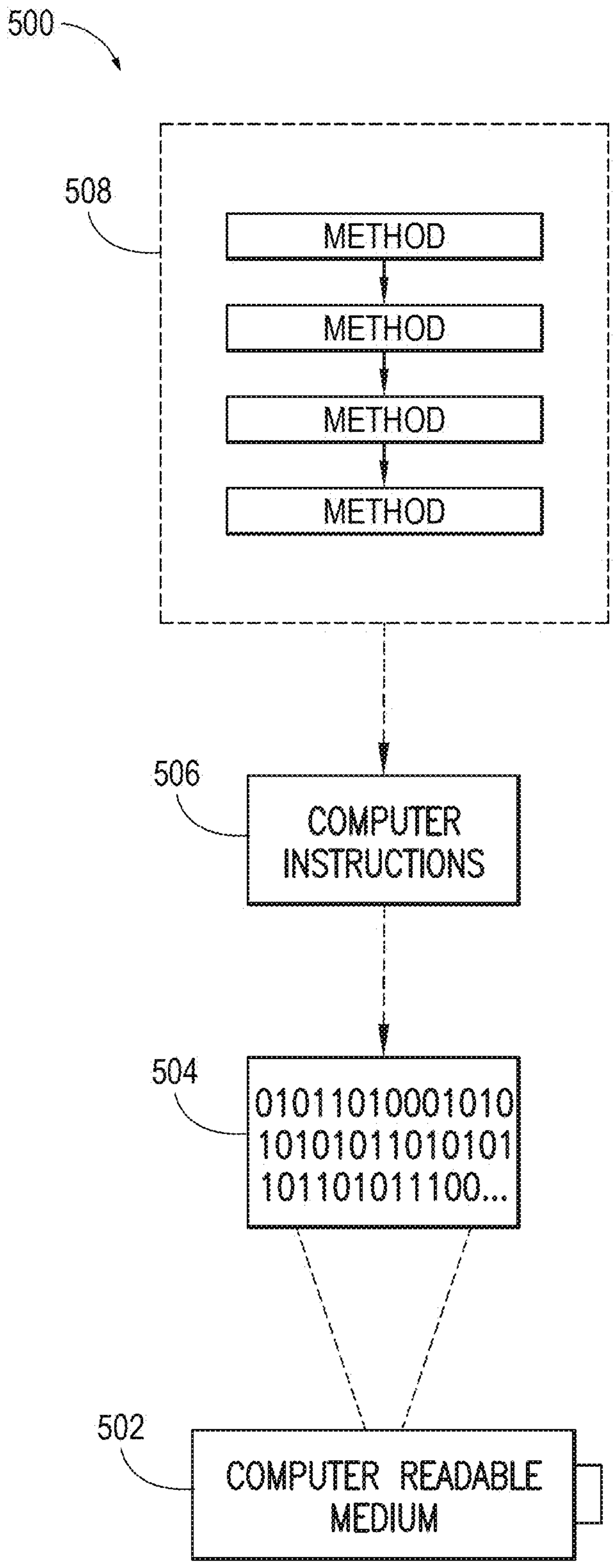
FIG. 5 is an illustration of an example computer-readable medium or computer-readable device including processor-executable instructions configured to embody one or more of the provisions set forth herein, according to one aspect.

Still another aspect involves a computer-readable medium including processor-executable instructions configured to implement one aspect of the techniques presented herein. An aspect of a computer-readable medium or a computer-readable device devised in these ways is illustrated in FIG. 5, wherein an implementation 500 includes a computer-readable medium 502, such as a CD-R, DVD-R, flash drive, a platter of a hard disk drive, etc., on which is encoded computer-readable data 504. This encoded computer-readable data 504, such as binary data including a plurality of zero's and one's as shown in 504, in turn includes a set of processor-executable computer instructions 506 configured to operate according to one or more of the principles set forth herein. In this implementation 500, the processor-executable computer instructions 506 may be configured to perform a method 508, such as the computer-implemented method 200 for learning perceived preferences in human-robot interactions (HRI) of FIG. 2. In another aspect, the processor-executable computer instructions 506 may be configured to implement a system, such as the system 100 for learning perceived preferences in human-robot interactions (HRI) of FIG. 1. Many such computer-readable media may be devised by those of ordinary skill in the art that are configured to operate in accordance with the techniques presented herein.

As used in this application, the terms "component", "module," "system", "interface", and the like are generally intended to refer to a computer-related entity, either hardware, a combination of hardware and software, software, or software in execution. For example, a component may be, but is not limited to being, a process running on a processor, a processing unit, an object, an executable, a thread of execution, a program, or a computer. By way of illustration, both an application running on a controller and the controller may be a component. One or more components residing within a process or thread of execution and a component may be localized on one computer or distributed between two or more computers.

Further, the claimed subject matter is implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Although the subject matter has been described in language specific to structural features or methodological acts, it is to be understood that the subject matter of the appended claims is not necessarily limited to the specific features or acts described above. Rather, the specific features and acts described above are disclosed as example aspects.

Various operations of aspects are provided herein. The order in which one or more or all of the operations are described should not be construed as to imply that these operations are necessarily order dependent. Alternative ordering will be appreciated based on this description. Further, not all operations may necessarily be present in each aspect provided herein.

As used in this application, "or" is intended to mean an inclusive "or" rather than an exclusive "or". Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has", "with", or variants thereof are used in either the detailed description or the claims, such terms are intended to be inclusive in a manner similar to the term "comprising".

Further, unless specified otherwise, "first", "second", or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel. Additionally, "comprising", "comprises", "including", "includes", or the like generally means comprising or including, but not limited to.

It will be appreciated that various of the above-disclosed and other features and functions, or alternatives or varieties thereof, may be desirably combined into many other different systems or applications. Also, that various presently unforeseen or unanticipated alternatives, modifications, variations, or improvements therein may be subsequently made by those skilled in the art which are also intended to be encompassed by the following claims.

The invention claimed is:

1. A system for learning perceived preferences in human-robot interactions (HRI), comprising:

a sensor sensing a noisy action from a human associated with a human-robot interaction (HRI) with a robot;

a memory storing one or more instructions;

a processor executing one or more of the instructions stored on the memory to perform:

generating a feature associated with the human based on the noisy action and an observation model;

generating a belief based on the feature and a belief model; and generating a robot action based on a reference trajectory, the belief, and one or more constraints, wherein one of the constraints for generating the robot action is a task space constraint, and wherein the belief is updated based on a human preference inferred from an observed action and the task space constraint; and a controller implementing the robot action for the HRI via a robot appendage of the robot and an actuator.

2. The system for learning perceived preferences in HRIs of claim 1, wherein the observation model is based on Boltzmann rationality and maximum entropy.

3. The system for learning perceived preferences in HRIs of claim 1, wherein the HRI is modeled as a Constrained Partially Observable Markov Decision Process (CPOMDP).

4. The system for learning perceived preferences in HRIs of claim 3, wherein the HRI is a bi-lateral interaction including a second human associated with a second HRI with a second robot.

5. The system for learning perceived preferences in HRIs of claim 4, wherein the second robot provides haptic feedback to the second human based on a human response to the robot action.

6. The system for learning perceived preferences in HRIs of claim 1, wherein the generating the belief is based on trajectory deformation of a current trajectory of the robot by replacing a waypoint of the current trajectory with a waypoint associated with the feature associated with the human based on the noisy action.

7. The system for learning perceived preferences in HRIs of claim 1, wherein the generating the belief is based on a maximum a posteriori (MAP) estimation of the belief.

8. The system for learning perceived preferences in HRIs of claim 1, wherein the generating the feature is based on a radial basis function (RBF).

9. The system for learning perceived preferences in HRIs of claim 1, wherein one or more of the constraints includes a joint limit constraint, a force constraint, a velocity constraint, an acceleration constraint, or a deviation constraint.

10. The system for learning perceived preferences in HRIs of claim 1, wherein the generating the robot action is based on a hierarchical optimization of a first constraint of the one or more constraints and a second constraint of the one or more constraints.

11. A computer-implemented method for learning perceived preferences in human-robot interactions (HRI), comprising:
- sensing a noisy action from a human associated with a human-robot interaction (HRI) with a robot;
- generating a feature associated with the human based on the noisy action and an observation model;
- generating a belief based on the feature and a belief model;
- generating a robot action based on a reference trajectory, the belief, and one or more constraints, wherein one of the constraints for generating the robot action is a task space constraint, and wherein the belief is updated based on a human preference inferred from an observed action and the task space constraint; and
- implementing the robot action for the HRI via a robot appendage of the robot and an actuator.

12. The computer-implemented method for learning perceived preferences in HRIs of claim 11, wherein the observation model is based on Boltzmann rationality and maximum entropy.

13. The computer-implemented method for learning perceived preferences in HRIs of claim 11, wherein the HRI is modeled as a Constrained Partially Observable Markov Decision Process (CPOMDP).

14. The computer-implemented method for learning perceived preferences in HRIs of claim 11, wherein the HRI is a bi-lateral interaction including a second human associated with a second HRI with a second robot.

15. The computer-implemented method for learning perceived preferences in HRIs of claim 14, wherein the second robot provides haptic feedback to the second human based on a human response to the robot action.

16. A robot for learning perceived preferences in human-robot interactions (HRI), comprising:
- a sensor sensing a noisy action from a human associated with a human-robot interaction (HRI) with the robot;
- a memory storing one or more instructions;
- a processor executing one or more of the instructions stored on the memory to perform:
- generating a feature associated with the human based on the noisy action and an observation model;
- generating a belief based on the feature and a belief model; and
- generating a robot action based on a reference trajectory, the belief, and one or more constraints, wherein one of the constraints for generating the robot action is a task space constraint, and wherein the belief is updated based on a human preference inferred from an observed action and the task space constraint; and
- a controller implementing the robot action for the HRI via a robot appendage of the robot and an actuator.

17. The robot for learning perceived preferences in HRIs of claim 16, wherein the observation model is based on Boltzmann rationality and maximum entropy.

18. The robot for learning perceived preferences in HRIs of claim 16, wherein the HRI is modeled as a Constrained Partially Observable Markov Decision Process (CPOMDP).

19. The robot for learning perceived preferences in HRIs of claim 18, wherein the HRI is a bi-lateral interaction including a second human associated with a second HRI with a second robot.

20. The robot for learning perceived preferences in HRIs of claim 19, wherein the second robot provides haptic feedback to the second human based on a human response to the robot action.

* * * * *